Dec. 20, 1932. T. J. H. PEIRCE 1,891,553
ATTACHMENT FOR HEADLIGHTS
Filed June 23, 1931
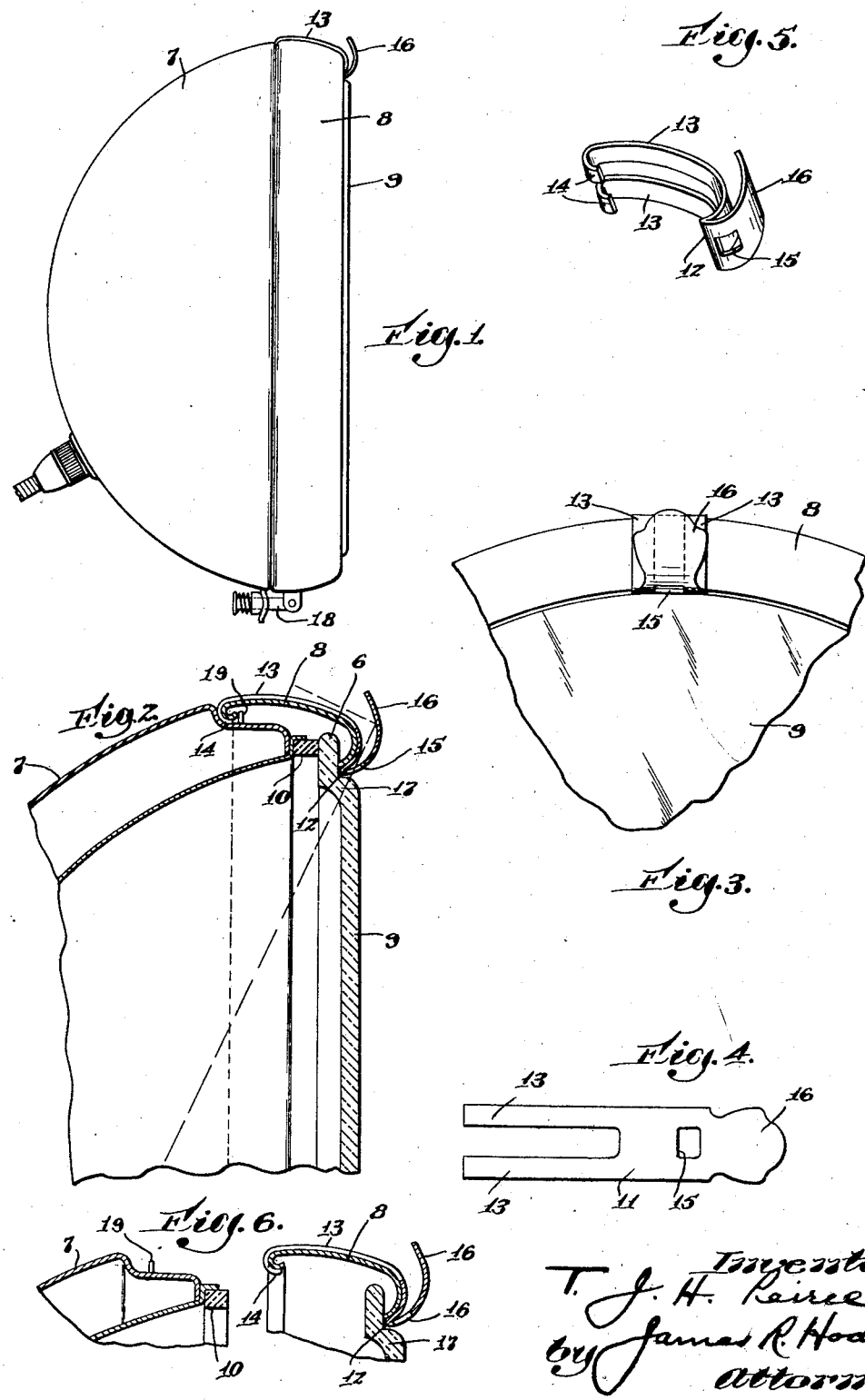

Patented Dec. 20, 1932

1,891,553

UNITED STATES PATENT OFFICE

THOMAS J. H. PEIRCE, OF PROVIDENCE, RHODE ISLAND, ASSIGNOR TO LEWIS R. SMITH, RECEIVER OF THE APCO MOSSBERG CORPORATION, A CORPORATION OF MASSACHUSETTS

ATTACHMENT FOR HEADLIGHTS

Application filed June 23, 1931. Serial No. 546,207.

My invention relates to improvements in automobile headlight attachments, and more particularly to attachments so formed and positioned as to clearly indicate to the driver of a vehicle whether or not the headlights are each lighted.

In view of the existing regulations against proceeding on the highway without having the headlights illuminated, it becomes very essential for the operator to be in position to know whether or not the automobile lights are functioning properly. At present it is somewhat difficult for a driver to ascertain whether both headlights are lit because of his remote position, and it is the principal object of my invention, therefore, to obviate this objection by providing suitably located reflectors so adapted that a glow from the headlights will be visibly apparent from the driving seat.

A further object of my invention resides in the fact that my device may be attached and detached very easily, quickly, and readily by even the most unskilled.

A still further object of my invention is to provide devices that are strong and lasting, of simple construction, inexpensive to manufacture, and adaptable to any type of headlight.

In carrying out my invention, I provide an attachment comprising a simple clip, part of which snaps on to the headlight rim, and part of which serves as a rearward reflector when the headlight is illumined.

Other objects and features of my invention, combination of parts, details, and advantages will be hereinafter more fully pointed out.

Referring to the drawing, wherein I show a preferred embodiment of my invention, Fig. 1 is a side elevation of the headlight with my device incorporated therein;

Fig. 2 is an enlarged fragmentary sectional view of the same;

Fig. 3 is a fragmentary front elevation of the same;

Fig. 4 is a plan view of my device as it comes through the stamping process;

Fig. 5 is a perspective view of my device detached but in readiness for instant use, and Fig. 6 is a fragmentary sectional view showing my device incorporated with the headlight rim, together with the top of the headlight casing, each in readiness for assembling.

In the drawing, 7 designates any usual headlight casing secured by a spring attachment 18 to a rim 8, said rim, in turn, supporting a lens or glass 9, provided with an inwardly turned marginal flange 6. Positioned within the rim 8 and pressing against the glass 9 is a circular strip of rubber, or other insulating material, 10 secured to the inner reflecting surface of the casing 7. My novel device consists of a thin strip of spring metal or the like, which may be stamped out substantially as shown in Fig. 4, having a body portion 11, parallelly extending arms 13, 13, an opening 15, and a reflecting member 16.

The strip is put through a forming machine and bent into clip form, as shown in Fig. 5, the parallel arms 13, 13 provided with crooked ends 14, 14, and together with the body portion 11 bowed to form an attaching spring clip, said body portion 11 folded to furnish a gripping means designated by 12. Integral with the fold 12 and curving upwardly therefrom is the reflecting member 16, having the opening 15 so positioned therein that rays from the lighting unit (not shown) will pass therethrough and strike the reflecting member 16 at such an angle that the glow may be readily seen by any person in the driving seat.

Thus formed, my device is easily and quickly incorporated with the headlight rim 8, in position as shown in Figs. 2 and 6, whether said rim 8 is in detached relation or incorporated as part of the headlight casing 7. My device is then held by the spring action, the body portion following the contour of the surface of the rim 8, while at one extremity the crooked ends 14, 14 lock between the inner edge of said rim 8 and said casing 7, the fold 12 at the outer end being secured under tension between the outer edge of said rim 8 and the outer top portion of the lens 9.

As shown in Figs. 1 and 2, with my device thus positioned at the front of the headlight, the reflecting member 16 is curved outwardly to a point slightly beyond the surface of the lens 9 and upwardly to a point sufficiently high to reflect the rays leading from the headlight through the lens 9, as at 17, and through the opening 15 onto the surface 16, thence rearwardly above the top of the casing 7.

I have preferably shown my headlight attachment adapted for the present type of Ford automobiles, and I have also shown a lens held by a marginal flange in contrast to the usual construction, wherein the rim serves as a bezel in securing the lens. I do not wish, however, to limit the application of my attachment to Ford cars, for, without departing from the spirit of my invention, I may adapt my device to fit any present type of automobile headlight.

It will thus be seen that I have devised a novel and useful attachment for automobile headlights which will be efficient, light, strong, non-rattling, simple, and durable and as fully effective as more expensive and cumbersome devices.

I have preferably shown a pin 19 positioned on the casing 7 to hold the rim in place during assembling, and a latch 18 to retain the same after assembling.

I claim:

An attachment for headlights comprising a spring member, having a body portion folded to hook with the forward end of the headlight rim, a pair of bowed arms projecting rearwardly from said body portion, a crooked end on each of said arms to engage with the rear edge of the headlight rim, said crooked ends and folded body portion forming a clip, an upwardly and forwardly extending adjustable curved reflecting member integral with said body member and having an opening in the lower part thereof through which light from the headlight passes to illuminate the upper part of said curved reflecting member, whereby light may be reflected rearwardly.

In testimony whereof, I have signed my name to this specification.

THOMAS J. H. PEIRCE.